(12) United States Patent
Chavan et al.

(10) Patent No.: US 11,420,141 B2
(45) Date of Patent: Aug. 23, 2022

(54) FUEL FILTER CARTRIDGE WITH KEYED PROFILE

(71) Applicant: CUMMINS FILTRATION IP, INC., Columbus, IN (US)

(72) Inventors: Priti Vishwas Chavan, Pune (IN); Anand Vijayan Menon, Pune (IN); Jeff A. Bowerman, Cookeville, TN (US); Eric Roysdon, Jamestown, TN (US); Aarol Duane Bright, Monterey, TN (US); Anil Ishwar Sawant, Pune (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 61 days.

(21) Appl. No.: 16/634,630

(22) PCT Filed: Aug. 16, 2018

(86) PCT No.: PCT/IB2018/056204
§ 371 (c)(1),
(2) Date: Jan. 28, 2020

(87) PCT Pub. No.: WO2019/035060
PCT Pub. Date: Feb. 21, 2019

(65) Prior Publication Data
US 2021/0170314 A1   Jun. 10, 2021

(30) Foreign Application Priority Data
Aug. 18, 2017   (IN) .............................. 201741029248

(51) Int. Cl.
*B01D 35/153* (2006.01)
*B01D 29/15* (2006.01)
(Continued)

(52) U.S. Cl.
CPC ........... *B01D 35/153* (2013.01); *B01D 29/15* (2013.01); *B01D 35/306* (2013.01);
(Continued)

(58) Field of Classification Search
CPC .............. B01D 29/15; B01D 2201/291; B01D 2201/316; B01D 2201/347; B01D 2201/162
(Continued)

(56) References Cited

U.S. PATENT DOCUMENTS 6,797,168 B1   9/2004   Knight
6,892,569 B2   5/2005   Martin et al.
(Continued)

FOREIGN PATENT DOCUMENTS

CN   1073371 A   6/1993
CN   1467372 A   1/2004
(Continued)

OTHER PUBLICATIONS

International Search Report from PCT Application No. PCT/IB2018/056204, dated Nov. 15, 2018.
(Continued)

*Primary Examiner* — Benjamin M Kurtz
(74) *Attorney, Agent, or Firm* — Foley & Lardner LLP

(57) ABSTRACT

A filtration system comprises a filter head assembly comprising an outlet slot, valve element, and latch element. The valve element is in fluid communication with the outlet slot and includes an open position and a closed position. In the open position fluid flow travels through the outlet slot. In the closed position fluid flow is prevented through the outlet slot. The latch element is configured to lock the valve element in the closed position. The filtration further comprises a filter cartridge structured to engage the filter head assembly. The filter cartridge comprises a first and second
(Continued)

filter end. The filter cartridge comprises filter media and a keyed element disposed on the first filter end. The keyed element is structured for engagement of the latch element, wherein the engagement unlocks the valve element causing the valve element to be in the open position.

15 Claims, 8 Drawing Sheets

(51) Int. Cl.
  *B01D 35/30* (2006.01)
  *B01D 46/00* (2022.01)
  *B01D 46/24* (2006.01)
  *F02M 37/34* (2019.01)
  *F02M 37/42* (2019.01)

(52) U.S. Cl.
  CPC ..... *B01D 46/0004* (2013.01); *B01D 46/0089* (2013.01); *B01D 46/2411* (2013.01); *F02M 37/34* (2019.01); *F02M 37/42* (2019.01); *B01D 2201/162* (2013.01); *B01D 2201/291* (2013.01); *B01D 2201/316* (2013.01); *B01D 2201/34* (2013.01); *B01D 2201/4053* (2013.01); *B01D 2201/4061* (2013.01); *B01D 2265/026* (2013.01); *B01D 2265/028* (2013.01); *B01D 2271/02* (2013.01)

(58) Field of Classification Search
  USPC .................................................. 210/234, 235
  See application file for complete search history.

(56) References Cited

U.S. PATENT DOCUMENTS

| | | | |
|---|---|---|---|
| 8,543,288 | B2 | 9/2013 | Bligard et al. |
| 8,628,663 | B2 | 1/2014 | Richmond et al. |
| 9,938,907 | B2 | 4/2018 | Hellemann |
| 2002/0174849 | A1 | 11/2002 | Ruggiero et al. |
| 2005/0000876 | A1 | 1/2005 | Knight |
| 2006/0054547 | A1 | 3/2006 | Richmond et al. |
| 2007/0241047 | A1* | 10/2007 | Roll .............. B01D 35/153 210/437 |
| 2008/0053886 | A1 | 3/2008 | Marshall et al. |
| 2008/0283462 | A1* | 11/2008 | Stamey, Jr. ......... B01D 29/21 210/437 |
| 2015/0096931 | A1 | 4/2015 | Jensen |

FOREIGN PATENT DOCUMENTS

| | | |
|---|---|---|
| CN | 101501322 A | 8/2007 |
| CN | 101584952 A | 11/2009 |
| EP | 0 060 106 A2 | 9/1982 |
| EP | 0 362 114 A2 | 4/1990 |
| ES | 2195946 T3 | 12/2003 |
| JP | 03-141858 A | 6/1991 |
| JP | 2001-140723 A | 5/2001 |
| JP | 63-94067 A | 9/2018 |
| WO | WO-2005/097294 A | 10/2005 |
| WO | wo-2013/159788 | 1/2013 |

OTHER PUBLICATIONS

Written Opinion from PCT Application No. PCT/IB2018/056204 dated Nov. 15, 2018, pp. 1-5.

* cited by examiner

FUEL FILTER CARTRIDGE WITH KEYED PROFILE

CROSS-REFERENCE TO RELATED APPLICATIONS

The present application is the U.S. National Phase of PCT Application No. PCT/IB2018/056204, filed Aug. 16, 2018 which claims priority to Indian Patent Application No. 201741029248, filed Aug. 18, 2017, the contents of which are incorporated herein by reference.

TECHNICAL FIELD

The present application relates to filter cartridges for filtering fluids in internal combustion engine systems or the like.

BACKGROUND

Internal combustion engines generally combust a mixture of fuel (e.g., gasoline, diesel, natural gas, etc.) and air. Prior to entering the engine, the fluid (e.g., liquid, air, fuel, etc.) is typically passed through a filtration system to remove contaminants (e.g., dust, water, oil, etc.) from the fluid. The filtration system includes a filter cartridge (e.g., filter element) having filter media. As the fluid passes through the filter media of the filter cartridge, the filter media removes at least a portion of the contaminants in the fluid, thereby preventing unwanted contaminants from entering the internal combustion engine. In some cases, unauthorized or non-genuine replacement filter cartridges may be installed in the filtration systems during servicing operations. The unauthorized and non-genuine replacement filter cartridges may be of inferior quality to genuine, authorized filter cartridges. Thus, the use of unauthorized or non-genuine replacement filter cartridges may cause damage to the engine by allowing contaminants past the filter cartridge.

Filter cartridges often include a seal member that is compressed against a component of the filtration system housing or another portion of the filtration system. The seal member forms a seal between the filtration system housing and the filter cartridge, thereby preventing fluid from bypassing the filter cartridge (e.g., for air to bypass an air filter cartridge or liquid to bypass a liquid filter cartridge). The seal can be formed by, for example, a key element deposed on the filter cartridge and a complementary key slot disposed on the housing. If one attempts to install an improper filter cartridge (e.g., a non-authorized or non-genuine filter cartridge, or a filter cartridge that is otherwise not intended for the particular filtration system), or if the proper filter cartridge is installed incorrectly, the seal member of the filter cartridge may not form a proper seal, and fluid may bypass the filter cartridge, causing damage to downstream components.

SUMMARY

Various example embodiments relate to a filtration system. The filtration system includes a filter head assembly includes an outlet slot, valve element, and a latch element. The valve element is in fluid communication with the outlet slot and defines an open position and a closed position. In the open position, fluid flow travels through the outlet slot. In the closed position, fluid flow is prevented through the outlet slot. The latch element is configured to lock the valve element in the closed position. The filtration further includes a filter cartridge structured to engage the filter head assembly. The filter cartridge includes a first and second filter end. The filter cartridge includes filter media and a keyed element disposed on the first filter end. The keyed element is structured for engagement of the latch element. The engagement of the keyed element with the latch element unlocks the valve element, causing the valve element to be in the open position.

Another example embodiment relates to a filter cartridge. The filter cartridge is structured to engage the filter head assembly. The filter cartridge includes a first and second filter end. The filter cartridge includes filter media and a keyed element disposed on the first filter end. The keyed element is structured for engagement of a latch element. The latch element is configured to lock a valve element in a closed position when not engaged by the keyed element. The valve element defines an open position and a closed position. In the open position, fluid flow travels from the internal cavity through an outlet slot. In the closed position, fluid flow is prevented through the outlet slot.

Yet another example embodiment relates to a filter head assembly. The filter head assembly is structured to receive a filter cartridge. The filter head assembly includes an outlet slot, valve element, and a latch element. The valve element is in fluid communication with the outlet slot and defines an open position and a closed position. In the open position, fluid flow travels through the outlet slot. In the closed position, fluid flow is prevented through the outlet slot. The latch element is configured to lock the valve element in the closed position. The engagement of a keyed element of the filter cartridge with the latch element unlocks the valve element, causing the valve element to be in the open position.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a fuel filter cartridge with a keyed element for a filtration system is described. The fuel filter cartridge with a keyed element is structured to interface with a head assembly section—or similar element in a filtration system—to allow for fluid to flow through the filtration system and to facilitate proper operation of the filtration system. The keyed element of the fuel filter cartridge is structured to unlock a latch element within the head assembly section, open a valve element, and allow for fluid flow to travel through a clean fuel outlet of the filtration system. In the absence of fuel filter cartridge with a keyed element, the latch element will remain locked and the valve element will remain closed, covering the clean fuel outlet. The covered clean fuel outlet may cause leakage, damage, or decrease in the quality of the product.

According to various embodiments, a fuel filter cartridge with a keyed element is provided that includes a filter cartridge with a keyed element. Generally, the keyed element is configured to interface with the valve element and/or unlock the latch element so as to open the valve element. In some embodiments, the keyed element is integrally formed on the filter cartridge. In other embodiments, the keyed element is a separate element that is coupled to the filter cartridge. In some embodiments, the keyed element is in the form of a rubber component with a bead and sealing edge.

Generally, the fuel filter cartridge with a keyed element can be of any configuration, including variations in the shape of the fuel filter cartridge with a keyed element, size of the fuel filter cartridge with a keyed element, and number of ridges or protrusion of the fuel filter cartridge with a keyed element. The fuel filter cartridge with a keyed element possesses a shape, length, width, and features that are specifically tailored to interface with a latch on a head assembly section. This ensures that the assembly of the fuel filter cartridge with a keyed element and head assembly section successfully unlocks the latch on the head assembly section and allows fluid flow through the clean (e.g., filtered) fuel outlet of the filtration system. While the fuel filter cartridge with a keyed element is described as interfacing with a head assembly section, the fuel filter cartridge with a keyed element can interface with a variety of filtration system components (e.g., a housing), in a variety of orientations and configurations.

Figure 1A:
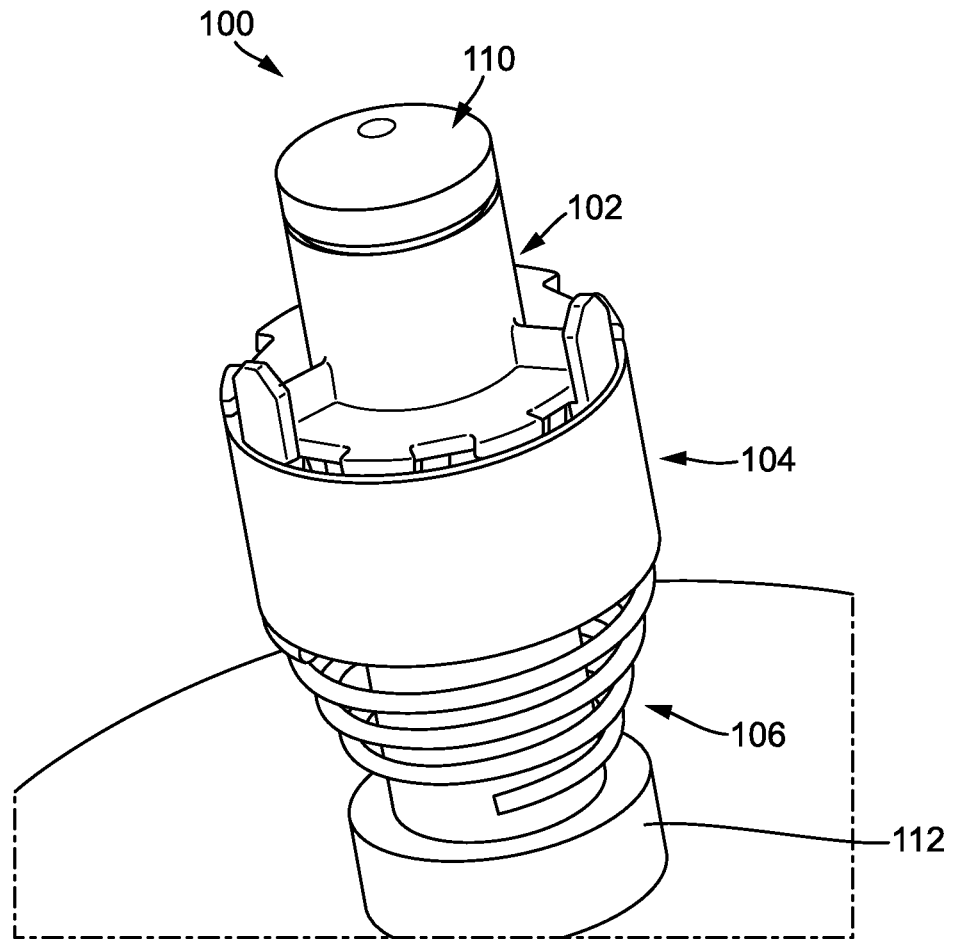
FIG. 1A shows a perspective view of a head assembly section, according to an example embodiment.
Figure 1B:
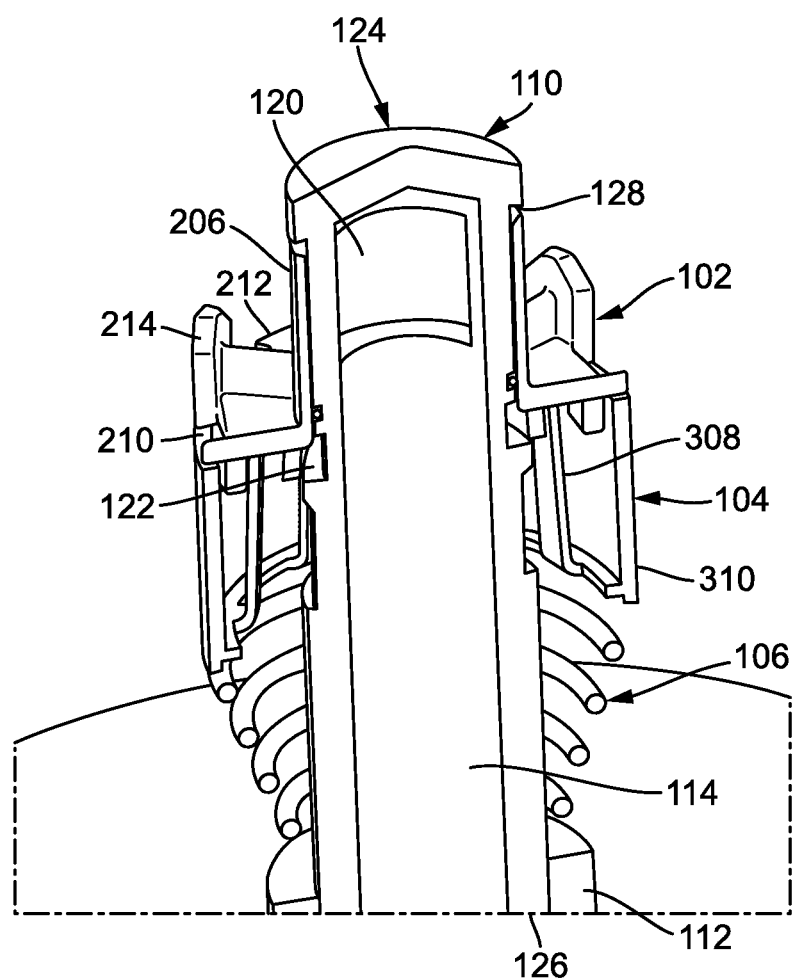
FIG. 1B shows a cross-sectional view of the head assembly section of FIG. 1A.

FIG. 1A is a perspective view of a head assembly section 100, according to an example embodiment. FIG. 1B shows a cross-sectional view of the head assembly section 100 of FIG. 1A. The head assembly includes a biasing element 106 (e.g., a spring), a latch element 104, and a valve element 102. A standpipe 110 extends from a base portion 112 through the center of the biasing element 106, latch element 104, and valve element 102. The standpipe 110 includes a first standpipe end 124 and a second standpipe end 126 that passes through the base portion 112. The standpipe 110 also defines an internal passage 114 that runs through the central portion of the standpipe 110 and out of the filtration system. A fluid outlet 120 (e.g., outlet slot) is disposed adjacent to the first standpipe end 124 that is configured to facilitate filtered fluid from outside of the standpipe 110 to the internal passage 114 of the standpipe 110. An annular groove 122 may be disposed between the fluid outlet 120 and the second standpipe end 126 and is configured to interface with a portion of the latch element 104. When the fluid outlet 120 is "open," (e.g., the valve element 102 is not surrounding and/or blocking the fluid outlet 120) filtered fluid is able to flow from outside the head assembly section 100, through the fluid outlet 120 of the standpipe 110, and into the internal passage 114 of the standpipe 110.

The valve element 102 is configured to cover the fluid outlet 120 up until a keying element engages the head assembly section 100 and allows the valve element 102 to move axially downward and uncover the fluid outlet 120 of the standpipe 110. The latch element 104 is configured to keep the valve element 102 closed and "locked" in an upward position (with respect to the standpipe 110) until a proper keying element engages the head assembly section 100 and unlocks the latch element 104. The latch element 104 may also be configured to engage the biasing element 106. The biasing element 106 may be configured to facilitate upward axial movement of the latch element 104 and valve element 102 such that the valve element 102 is biased upward and closes the fluid outlet 120. The biasing element 106 may also be configured to facilitate upward axial movement of a filter cartridge, for example, the biasing element 106 may assist in moving the filter cartridge upwardly, when the filter cartridge is replaced.

As shown in FIGS. 1A and 1B, when the head assembly section 100 is not engaged by a keyed element, the valve element 102 is in a first position (e.g., closed) along the standpipe 110. At the first position, the valve sleeve 206 cover the fluid outlet 120 and blocks fluid flow through the fluid outlet 120 of the standpipe 110. In some embodiments, the latch element 104 is locked or latch onto the standpipe 110 or filter head assembly section 100 impeding downward axial movement of the valve element 102. The valve element 102 will remain in the first position due, at least in part, to the biasing element 106 moving the latch element 104 and valve element 102 upwardly. In some embodiments, the biasing element 106 also provides a bending moment on the latch element 104 to force a plurality of fingers 308 back into the groove 122 of the standpipe 110 to lock the latch element 104 along the standpipe 110, thereby locking the valve element 102 in the closed position. The shoulder 128 of the standpipe 110 limits the upward movement of the valve element 102.

Figure 2:
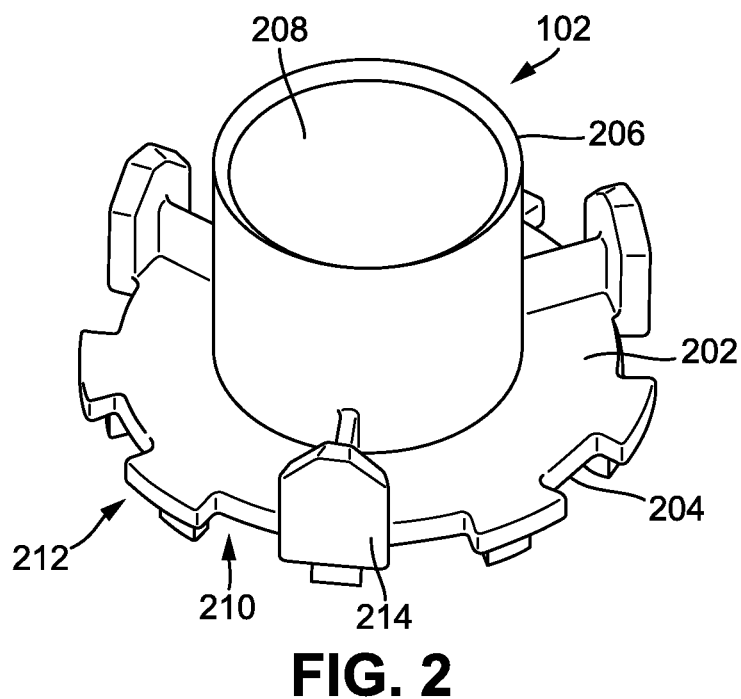
FIG. 2 shows a perspective view of the valve element of the head assembly section of FIG. 1A.

Turning to FIG. 2, a perspective view of the valve element 102 of FIGS. 1A-1B is shown. The valve element 102 includes a first valve end 202 and a second valve end 204 that form a base portion of the valve element 102. An annular valve sleeve 206 extends upward from the first valve end 202 in the direction away from the second valve end 204. The annular valve sleeve 206 is configured to facilitate movement of the sleeve along the standpipe 110. Beneficially, the annular valve sleeve 206 closes the fluid outlet 120 when a filter cartridge with keyed element is removed, which prevents unclean fuel and contaminants from entering the fluid outlet 120. The annular valve sleeve 206, the first valve end 202, and the second valve end 204 define a valve opening 208 that extends centrally through the valve element 102. The valve opening 208 is configured to closely fit around the standpipe 110.

A plurality of radially-projecting ribs 214 are disposed on the first valve end 202. Each rib in the plurality of radially-projecting ribs 214 extends from the valve sleeve 206 radially outward toward the outer diameter of the first valve end 202. While three radially-projecting ribs 214 are shown in FIG. 2, additional or fewer ribs may be formed on the first valve end 202. In some embodiments, the radially-projecting ribs 214 may have varying shapes and heights to facilitate engagement with a keyed element and/or a portion of the filter cartridge. In some embodiments, one or all of the plurality of radially-projecting ribs 214 are configured to engage a surface of the filter cartridge and/or keyed element to facilitate the downward axial movement of the valve element 102.

A plurality of tabs 212 are disposed between the first valve end 202 and the second valve end 204. The plurality of tabs 212 extend radially outward from a side of the valve element 102. In other words, the plurality of tabs 212 extend outwardly in a common plane from the base of the valve sleeve 206. In some embodiments, each tab in the plurality of tabs 212 is equally spaced from adjacent tabs in the plurality of tabs 212. A plurality of slots 210 are disposed between each tab in the plurality of tabs 212. While the plurality of tabs 212 and plurality of slots 210 are shown to have a substantially rectangular configurations, the geometry, as well as the number and location of the each tab and each slot, can vary depending upon the particular application. In some embodiments, the valve sleeve 206, first valve end 202, second valve end 204, plurality of radially-projecting ribs 214, and plurality of tabs 212 are formed as a single integral unit and/or as a single piece.

Figure 3:
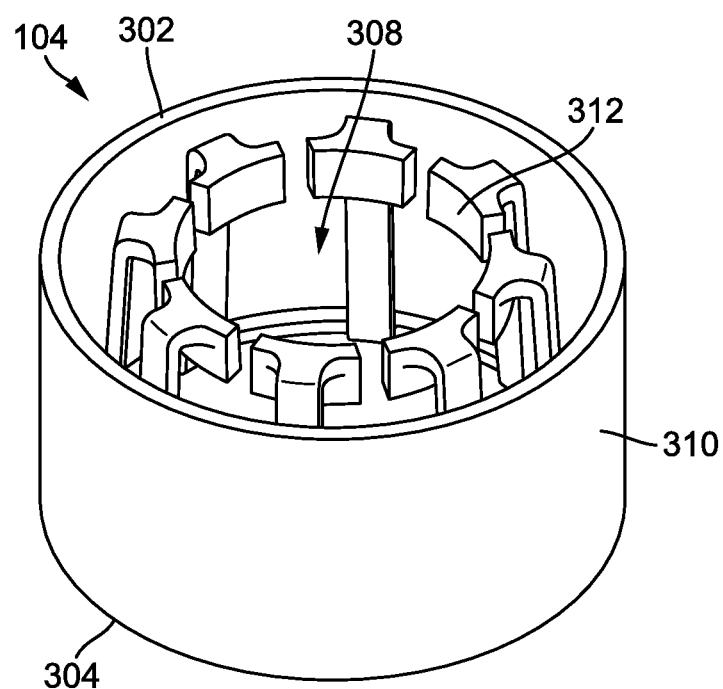
FIG. 3 shows a perspective view of the latch element of the head assembly section of FIG. 1A.

Turning to FIG. 3, a perspective view of the latch element 104 of FIGS. 1A-1B is shown. The latch element 104 is configured to "lock" and impede axial downward movement of the valve element 102. When the latch element 104 is locked, the valve element 102 is in a first, closed position. Once the latch element 104 is unlocked (e.g., axial movement is not impeded), the valve element 102 may be moved axially downward when a sufficient axial force is applied. The latch element 104 includes a first latch end 302, a second latch end 304, and a latch sleeve 310 extending annularly between the first latch end 302 and the second latch end 304. The latch element 104 defines a central latch opening 306 that extends therethough and is configured to receive the standpipe 110. In some embodiments, the first latch end 302 is configured to engage a portion of the valve element 102. For example, the first latch end 302 may engage a surface of one or more tabs in the plurality of tabs 212. The second latch end 304 may be configured to properly engage the biasing element 106 to bias the valve element 102 in the closed position.

A plurality of fingers 308 extend inwardly from the second latch end 304 in an upward direction toward the first latch end 302 and are configured to engage the standpipe 110. The plurality of fingers 308 may be radially flexible and in an evenly-spaced, annular arrangement. Each finger in the plurality of fingers 308 includes a distal end 312. In some embodiments, each finger in the plurality of fingers 308 is connected at the base of the finger to an internal surface of the second latch end 304, extends radially-inward from the latch sleeve 310, axially-upward, and finally radially inward at the distal end 312. Each distal end 312 of the plurality of fingers 308 may be configured to engage a portion of the groove 122 of the standpipe 110 when compressed. In some embodiments, when the latch element 104 is received around the standpipe 110, the plurality of fingers 308 surround the standpipe 110 such that the plurality of fingers 308 are each forced slightly outwardly. As will be appreciated, the number, dimension and location of each finger in the plurality of fingers 308 can also vary depending upon the particular application.

Figure 4:
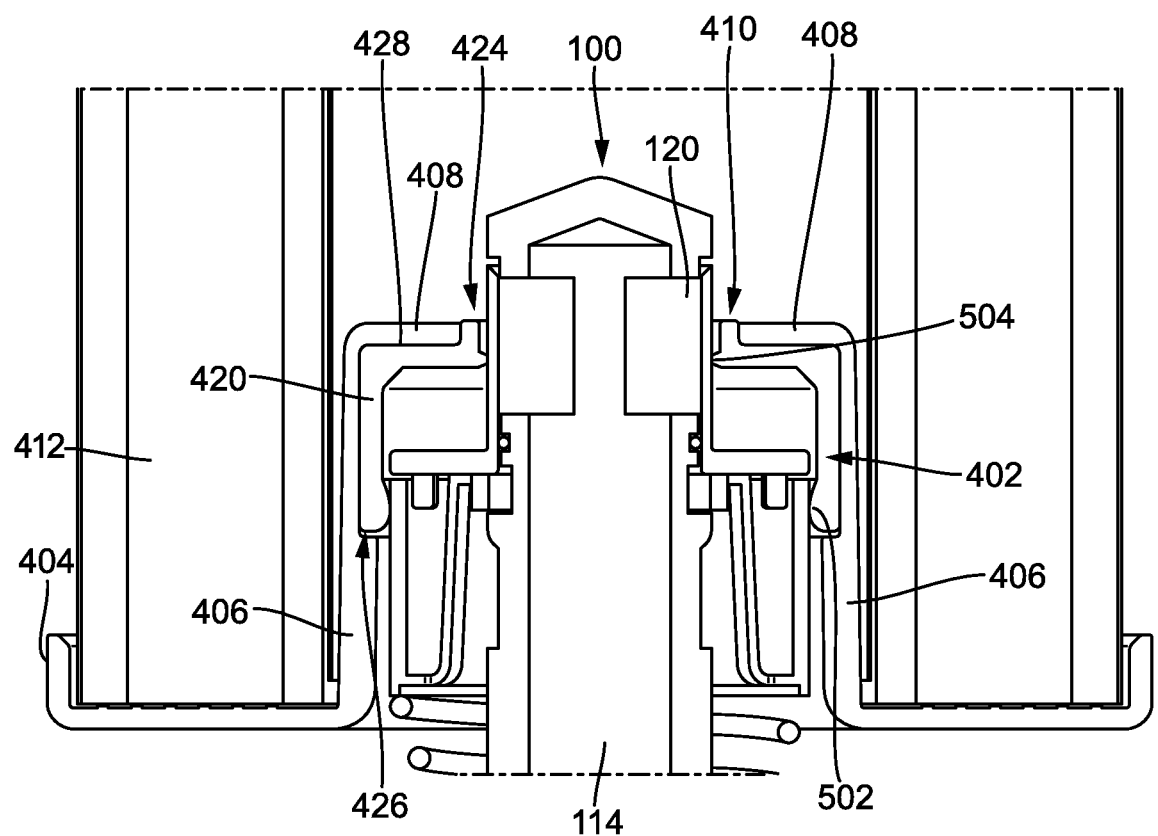
FIG. 4 shows a cross-sectional view of a filter cartridge with a keyed element on a head assembly section, according to an example embodiment.

Referring to FIG. 4, a cross-sectional view of a filter cartridge 400 with a keyed element 402 installed on the head assembly section 100 of FIG. 1B is shown, according to an example embodiment. The filter cartridge 400 includes filter media 412 axially disposed between a first endplate 404 and a second endplate. The first endplate 404 includes an annular endplate wall 406 and an annular endplate surface 408 that defines a central endplate opening 410. The endplate opening 410 is configured to receive a portion of the standpipe 110 of the head assembly section 100. In some embodiments, the first standpipe end 124, including the fluid outlet 120, and a portion of the valve element 102 are disposed through the endplate opening 410 and internal of the filter media 412. The first endplate 404 is configured to receive the keyed element 402 on a portion of the first endplate 404. As shown in FIG. 4, the first endplate 404 is a potted endplate that receives the keyed element on a surface that receives the head assembly section 100.

Figure 5:
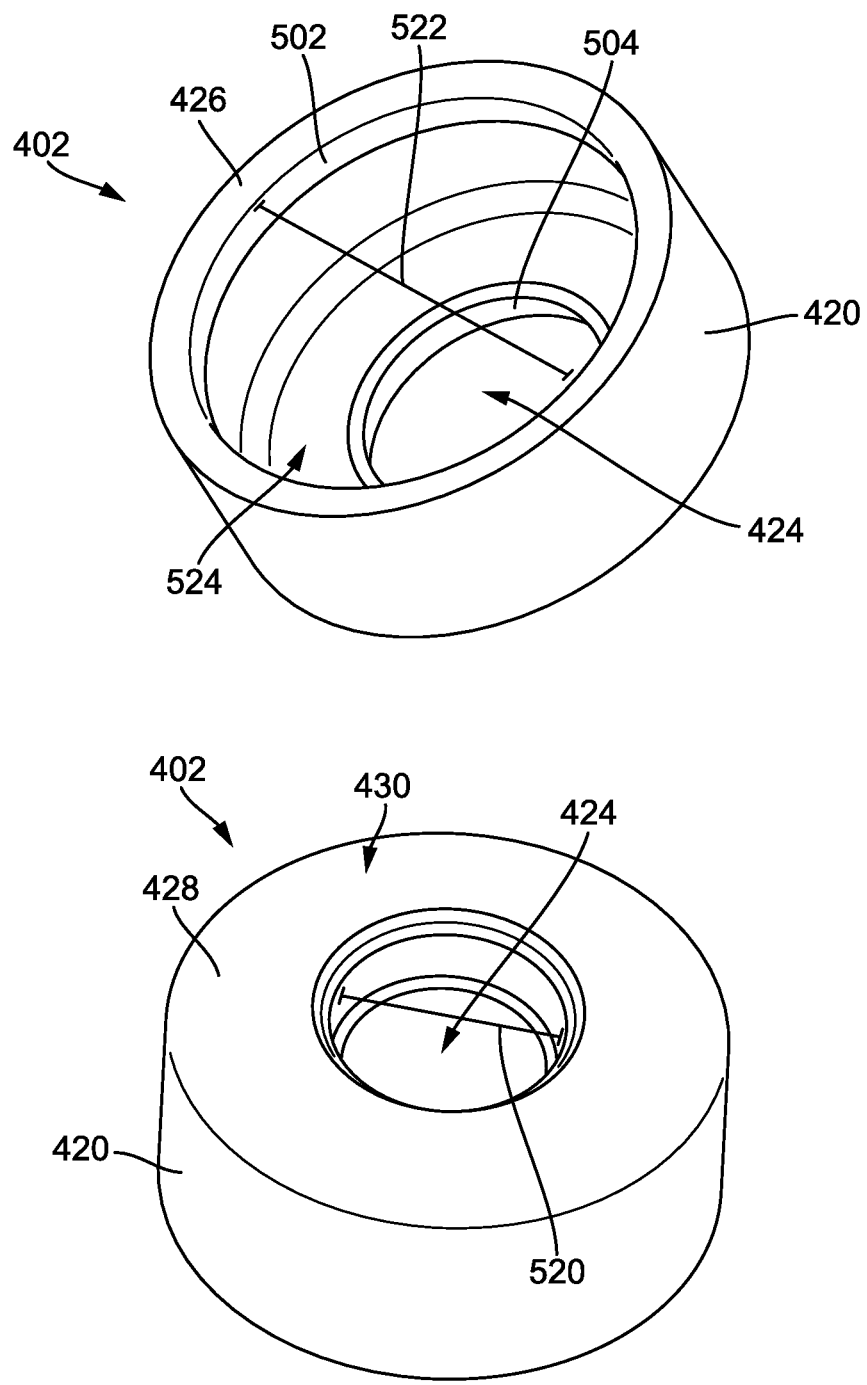
FIG. 5 shows a pair of perspective views of the keyed element of FIG. 4

The keyed element 402 may be disposed on an internal surface (e.g., a surface not in contact with an internal portion of the filter media 412) of the first endplate 404 such that the keyed element 402 is between the first endplate 404 and head assembly section 100 when the filter cartridge 400 is installed. As shown in FIG. 4, the keyed element 402 may be press-fit along an external (e.g., not in contact with the filter media 412) surface of the endplate wall 406 and endplate surface 408. In some embodiments, the keyed element 402 is a rubber component. As shown in FIG. 5, the keyed element 402 includes a base portion 428 on a first end 430 of the keyed element and an annular wall 420 that extends axially from the base portion 428 toward a second end 426. The annular wall 420 is configured to extend around a circumference of the base portion 428. In other words, the keyed element 402 is cap shaped with a central first keyed opening 424 defined in the base portion 428. The first keyed opening 424 has a first diameter 520 to interface with a portion of the standpipe 110 of the head assembly section 100. A second keyed opening 524 is defined on the second end 426 and has a second diameter 522. The second keyed opening 524 is configured to engage the head assembly selection 100.

An annular sealing edge 504 is formed around the lip of the keyed element opening 424 and is configured to sealingly engage the head assembly section 100 such that fluid flow is directed through the fluid outlet 120 (when open) and impedes leakage through the head assembly section 100 and/or first endplate 404. An annular bead edge 502 is formed around the lip (e.g., internal circumference) of the second keyed opening 524 of the second end 426 and protrudes inward toward the central axis of the keyed element 402. Generally, the annular bead edge 502 is configured to engage the head assembly section 100 during installation of the filter cartridge 400 in a way that allows the valve element 102 to move axially downward to a second position. When the valve element 102 is in the second position, the fluid outlet 120 is open (e.g., either partially or fully) thereby allowing fluid to flow from internal of the filter media 412 to the internal passage 114 that runs through the central portion of the standpipe 110 and eventually out of the filtration system. In some embodiments, the annular bead edge 502 comprises rubber.

The annular bead edge 502 may be structured to press up against the latch sleeve 310 of the latch element 104 and cause the latch element 104 to lift (e.g., move axially upward). Additionally, and as shown in FIG. 4, the keyed element 402 protrudes (e.g., bulges) into one or more slots in the plurality of slots 210 of the valve element 102 and assists the frictional force applied on the latch element 104. In some embodiments, a portion of the annular bead edge 502 and a portion of the annular wall 420 protrude into one or more slots in the plurality of slots 210 of the valve element 102. In other embodiments, only the annular wall 420 protrudes into one or more slots in the plurality of slots 210 of the valve element 102 to assist the frictional force applied on the latch element 104. Alternatively, in some embodiments, only the annular bead edge 502 protrudes into one or more slots in the plurality of slots 210 of the valve element 102 to assist the frictional force applied on the latch element 104. As will be readily apparent, the combination of the keyed element 402 pressing on the latch sleeve 310 and protruding into one or more slots in the plurality of slots 210 of the valve element 102 causes the latch element 104 to unlock. The unlocking of the latch element 104 allows for the valve element 102 to move axially downward due to the axial installation force of the filter cartridge 400 onto the head assembly section 100. Once the fluid outlet 120 is uncovered from the valve sleeve 206, filtered fluid can flow through the standpipe 110 to one or more outlet slots of the filtration system.

Figure 6:
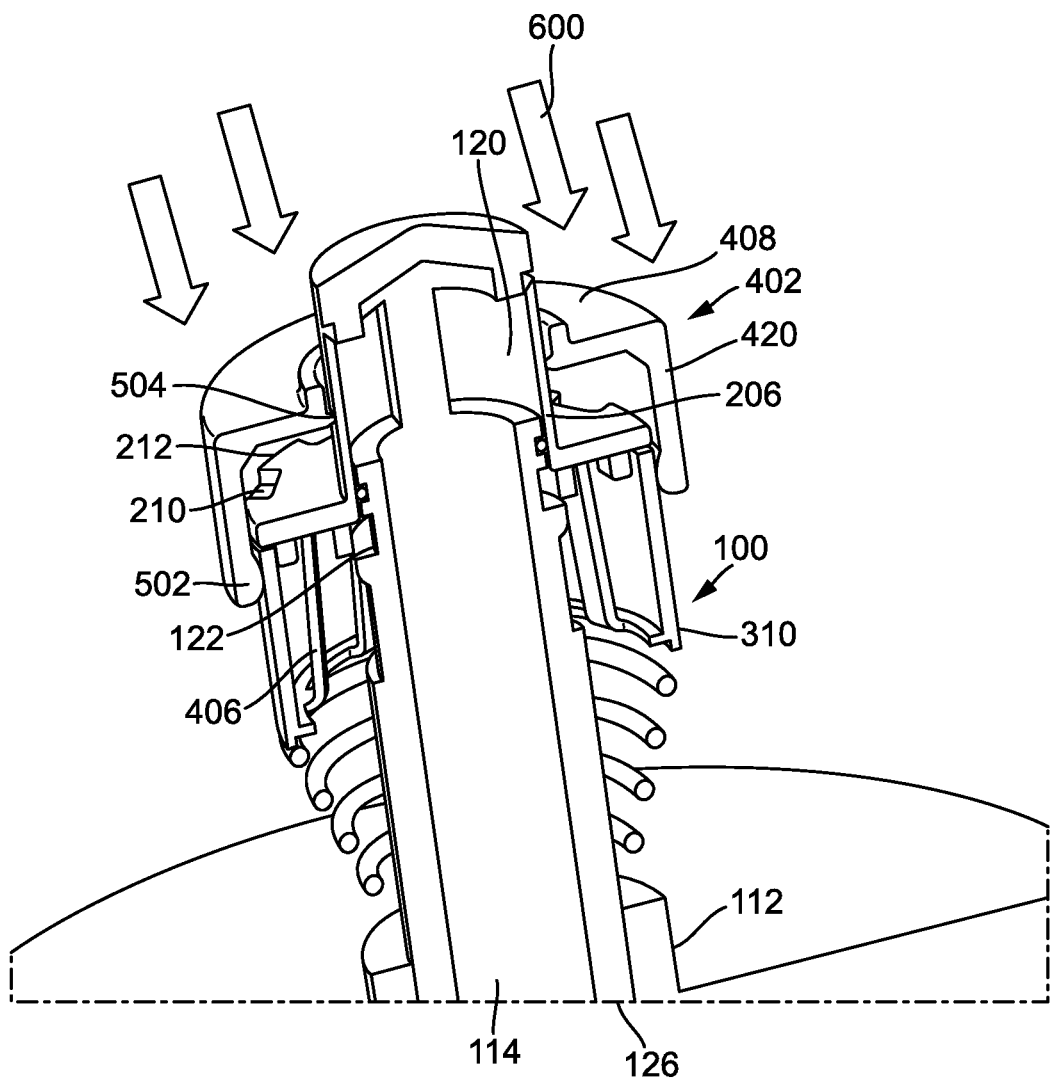
FIG. 6 shows a cross-sectional view of the keyed element of FIG. 5 during the installation onto a head assembly section, according to another example embodiment.

Referring to FIG. 6, a cross-sectional view of the installation of the keyed element 402 of the filter cartridge 400 onto a head assembly section 100 is shown, according to another example embodiment. During installation, the keyed element 402 is installed with a substantially axial installation force 600 applied to it, by way of a substantially axial installation force applied to filter cartridge 400. At rest, as shown in FIG. 6, the valve element 102 is "locked" in a closed configuration (e.g., blocking flow to the fluid outlet 120) by a latch element 104, as the latch element 104 prevents the valve element 102 from opening unless the correct key interface is used. The annular bead edge 502 of the keyed element 402 is structured to engage the latch element 104 under the axial installation force 600 and unlock the latch element 104 and open the valve element 102. As shown in FIG. 6, the annular bead edge 502 interfaces with an outer surface of the latch element 104. At this position, the annular bead edge 502 protrudes (e.g., bulges) into one or more slots in the plurality of slots 210 of the valve element 102 on the valve element 102 and aids the frictional force on an outer surface (e.g., latch sleeve 310) of the latch element 104, eventually causing the latch element 104 to become unlocked, thereby unlocking the valve element 102. Once unblocked, the fluid outlet 120 of the head assembly section 100 allows for filtered fuel to flow out of the filtration system when the valve element 102 is open.

Figure 7A:
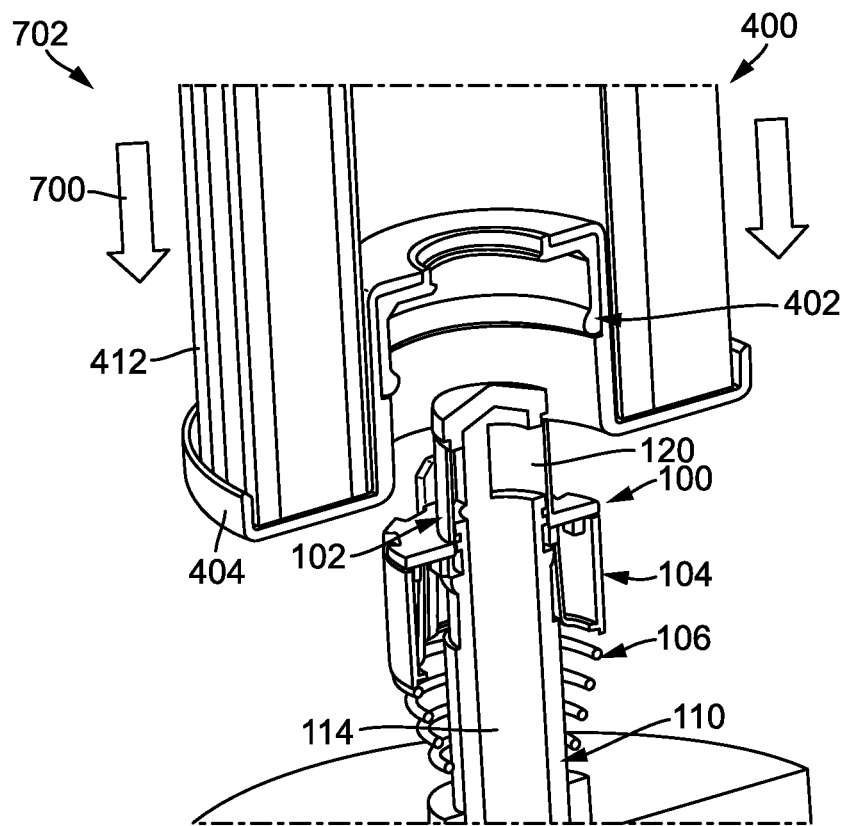
FIG. 7A shows a cross-sectional view of a filter cartridge with keyed element in a first position during installation onto a head assembly section, according to a further example embodiment.

Referring to FIG. 7A, a cross-sectional view of a first position 702 of the installation of the filter cartridge 400 with keyed element 402 onto the head assembly section 100 is shown, according to an example embodiment. The filter cartridge 400 is installed by exerting a substantially axial installation force 700 onto the filter cartridge 400 in the direction of the head assembly section 100. As shown in FIG. 7A, the keyed element 402 is disposed along the "U"-shaped portion of the first endplate 404, on a surface opposite of the surface that is in contact with the filter media 412. The keyed element 402 maybe a separate element that is fit (e.g., snap-fit, press fit, interference fit, frictional fit, etc.) into the first endplate 404. In some embodiments, the keyed element 402 may be integrally formed onto the first endplate 404. In the first position 702, the valve element 102 is closed and unable to move axially downward because the latch element 104 is locked a correct key interface is used. Accordingly, in the first position, the fluid outlet 120 (e.g., outlet slot) is closed as the filter cartridge 400 with keyed element 402 has not engaged the head assembly section 100.

Figure 7B:
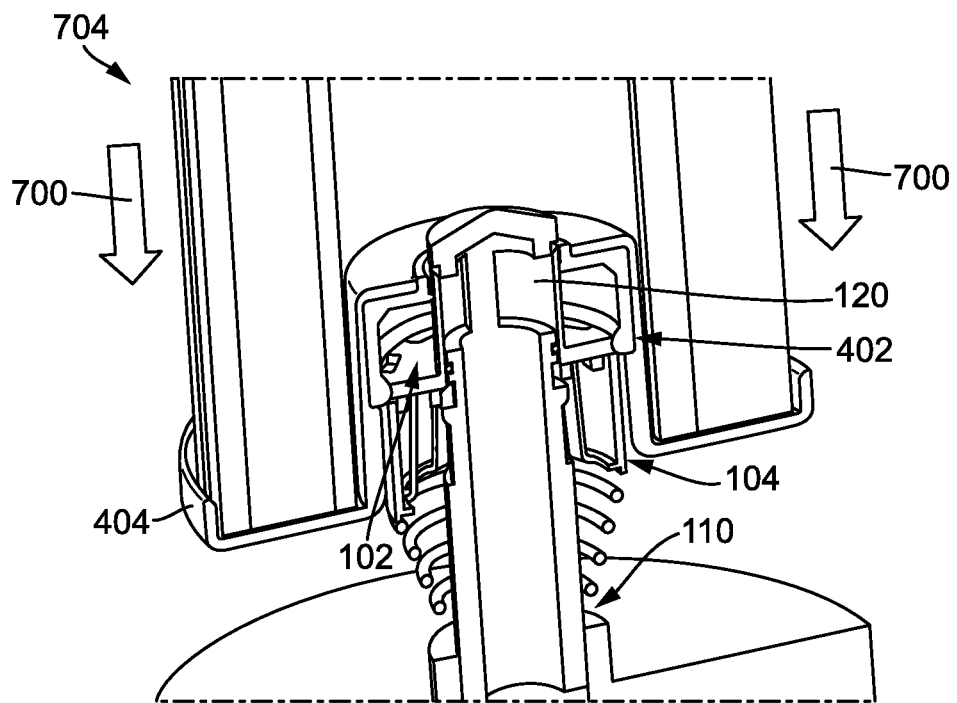
FIG. 7B shows a cross-sectional view of the filter cartridge with keyed element of FIG. 7A in a second position.

FIG. 7B shows a cross-sectional view of a second position 704 of the installation of the filter cartridge 400 with keyed element 402 onto the head assembly section 100. In the second position 704, the keyed element 402 interfaces with the latch sleeve 310 of the latch element 104 as the substantially axial installation force 700 is applied to the filter cartridge 400. Specifically, the annular bead edge 502 of the keyed element 402 is in contact with the valve element 102. At the second position 704, the fluid outlet 120 remains closed as the valve element 102 movement is prevented by the locked (but in the process of unlocking) latch element 104.

Figure 7C:
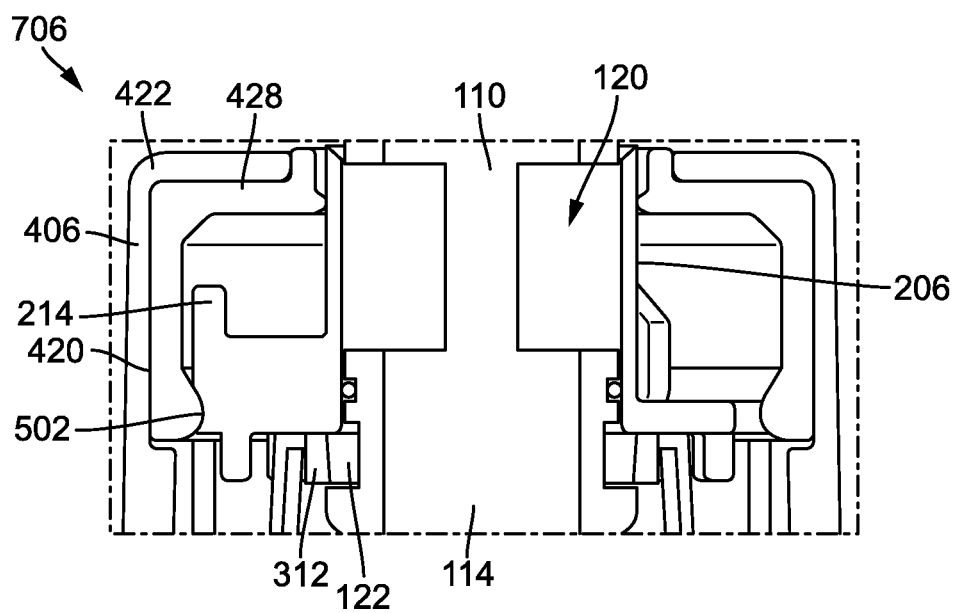
FIG. 7C shows a detailed cross-sectional view of the filter cartridge with keyed element of FIG. 7B in a third position.

FIG. 7C shows a cross-sectional view of a second position 706 of the installation of the filter cartridge 400 with keyed element 402 onto the head assembly section 100. In the third position 706, the annular bead edge 502 of the keyed element 402 is bulging into one or more slots in the plurality of slots 210 of the valve element 102. As will be appreciated, the application of the substantially axial installation force 700 and the bulging of the annular bead edge 502 into the plurality of slots 210 assists the frictional force on an outer surface (e.g., top of, side of, or both portions) of the latch element 104. The combination of the keyed element engaging the valve element 102 and latch element 104 unlocks the latch element 104, thereby freeing the valve element 102 to move axially downward. In some embodiments, the contact of the annular bead edge 502 with the latch element 104 (e.g., the second position 704) and the engagement of the keyed element 402 with the one or more slots in the plurality of slots (e.g., the third position 706) of the valve element 102 may occur substantially simultaneously. As will be appreciated, if the substantially axial installation force 700 is greater than the opposing axial force provided by the biasing element 106, then the valve element 102 will move axially downward.

Figure 7D:
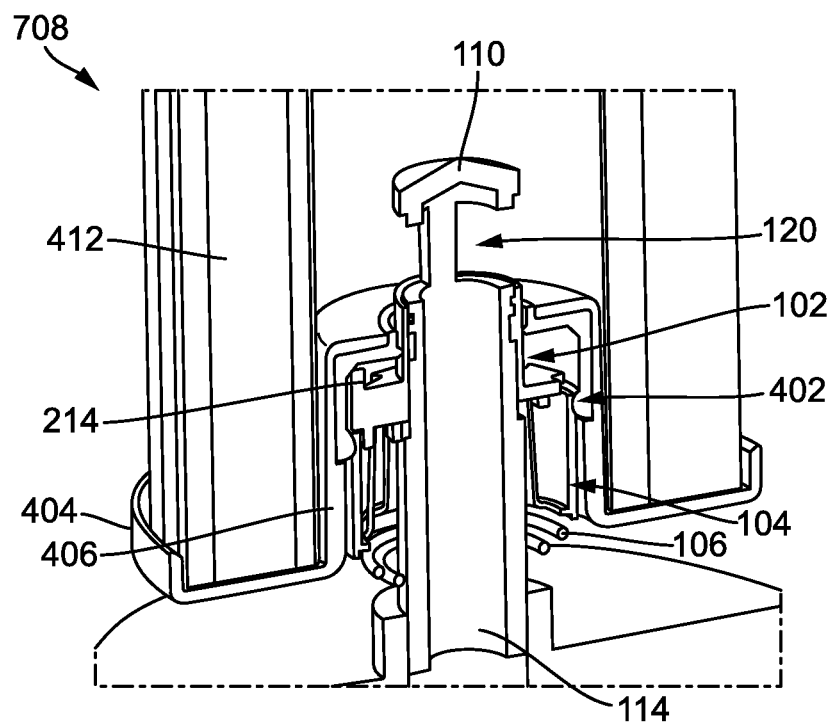
FIG. 7D shows a cross-sectional view of the filter cartridge with keyed element of FIG. 7A in a fourth position.

Referring to FIG. 7D, a cross-sectional view of a fourth position 708 of the installation of the filter cartridge 400 with keyed element 402 onto the head assembly section 100 is shown. The substantially axial installation force 700 and the contact of the bottom surface of the first endplate 404 causes the valve element 102 to slide axially down the standpipe 110 from the third position 706 to the fourth position 708. In the fourth position 708, the fluid outlet 120 is open and filtered fuel can flow out of the head assembly section 100. As is readily apparent, the substantially axial installation force 700 is greater than the opposing axial force provided by the biasing element 106 allowing the valve element 102 to move axially downward.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any method steps or processes may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system, comprising:
a filter head assembly comprising:
an outlet slot;
a valve element in fluid communication with the outlet slot, the valve element defining an open position and a closed position, wherein in the open position, fluid flow travels through the outlet slot, and wherein in the closed position, fluid flow is prevented through the outlet slot, the valve element comprising a plurality of slots; and
a latch element configured to lock the valve element in the closed position; and
a filter cartridge structured to engage the filter head assembly, the filter cartridge having a first filter end and a second filter end, the filter cartridge comprising:
filter media; and
a keyed element disposed on the first filter end, the keyed element structured for engagement of the latch element, the keyed element comprising an annular base portion on a first end of the keyed element and an annular wall extending axially from the annular base portion toward a second end of the keyed element, an annular edge formed around an internal surface of the annular wall and protruding inward and configured to protrude into one or more of the plurality of slots when the filter cartridge is engaged with the filter head assembly, the annular edge adjacent to the second end of the keyed element, and the annular edge configured to engage the latch element and unlock the valve element, causing the valve element to be in the open position.

2. The filtration system of claim 1, wherein the keyed element comprises a first keyed opening defined on the annular base portion and having a first diameter, and a second keyed opening defined on the second end of the keyed element and having a second diameter.

3. The filtration system of claim 2, wherein the keyed element further comprises a sealing edge formed around a lip of the first keyed opening, the sealing edge configured to sealingly engage the filter head assembly such that fluid flow is directed through the outlet slot when the valve element is in the open position.

4. The filtration system of claim 2, wherein the annular edge is an annular bead edge configured to engage the latch element and unlock the valve element.

5. The filtration system of claim 4 wherein the latch element comprises a first latch end, a second latch end, and an annular latch sleeve extending from the first latch end toward the second latch end, wherein the annular bead edge is configured to press up against the annular latch sleeve and unlock the valve element.

6. The filtration system of claim 4, wherein the annular bead edge is configured to bulge into a portion of the valve element to engage a portion of the latch element.

7. The filtration system of claim 1, wherein the first filter end comprises a filter end internal surface and an external surface, the filter end internal surface in contact with the filter media, wherein the keyed element is disposed on the external surface.

8. The filtration system of claim 1, wherein the filter head assembly further comprises a spring, the spring configured to engage the latch element and bias the latch element axially upward toward the valve element such that the valve element is biased in the closed position.

9. The filtration system of claim 1, wherein the filter head assembly further comprises a standpipe, the outlet slot disposed on the standpipe, the standpipe comprising an internal passage in fluid communication with the outlet slot, and the standpipe configured to pass through an opening defined in the valve element and an opening defined in the latch element.

10. The filtration system of claim 9, wherein the standpipe comprises a shoulder disposed on a first standpipe end, the shoulder configured to engage a valve end of the valve element and prevent axial movement of the valve element along the standpipe.

11. The filtration system of claim 10, wherein the valve element comprises a first valve end, a second valve end, and an annular valve sleeve extending from the first valve end axially away from the second valve end, wherein in the closed position, the valve element is disposed along the standpipe such that the annular valve sleeve covers the outlet slot, and wherein in the open position the valve element is disposed along the standpipe such that the annular valve sleeve does not cover the outlet slot.

12. The filtration system of claim 11, wherein the valve element comprises a rib disposed on the first valve end of the valve element, the rib projecting radially outward from the opening in the valve element toward a perimeter of the first valve end, wherein the rib is configured to engage a portion of the keyed element.

13. The filtration system of claim 1, wherein the valve element comprises a first valve end, a second valve end, and a plurality of tabs disposed between the first valve end and the second valve end, each tab in the plurality of tabs extending radially outward and comprising a first tab end in a common plane with the first valve end and a second tab end in a common plane with the second valve end.

14. The filtration system of claim 1, wherein the latch element comprises a first latch end, a second latch end, an annular latch sleeve extending from the first latch end toward the second latch end, and a plurality of fingers, the annular latch sleeve defining a central opening therethrough, each finger in the plurality of fingers comprising a first finger end, a second finger end, and a finger body extending from the first finger end to the second finger end, the second finger end connected to the second latch end, the finger body extending radially inward toward the central opening and upward toward the first latch end toward the first finger end.

15. The filtration system of claim 14, wherein the filter head assembly further comprises a standpipe disposed in the central opening such that the plurality of fingers surround the standpipe, the standpipe comprising an annular groove, wherein each finger in the plurality of fingers comprises a distal end on the first finger end, the distal end configured to engage the annular groove of the standpipe when the latch element locks the valve element in the closed position.

\* \* \* \* \*